Patented July 26, 1932

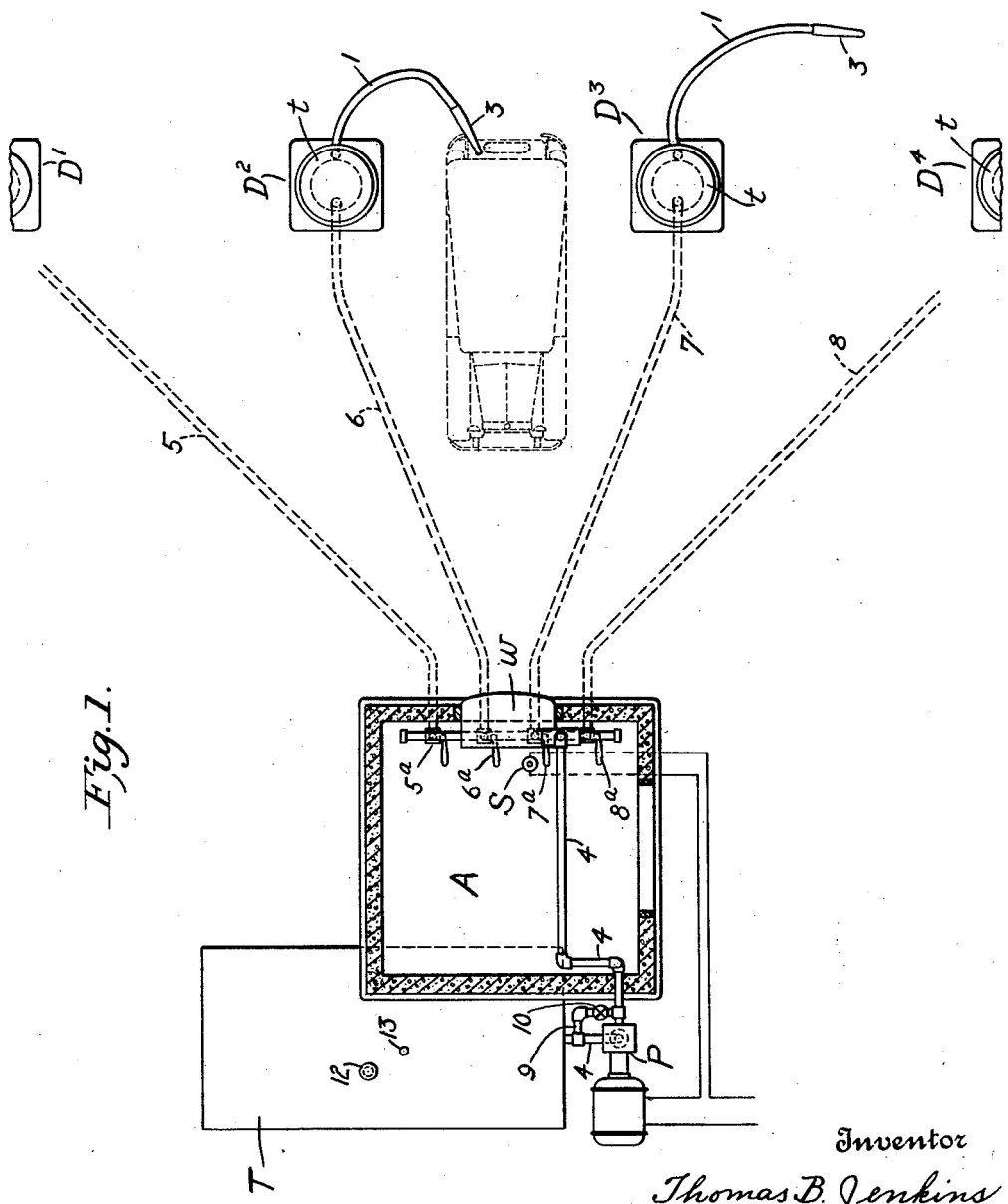

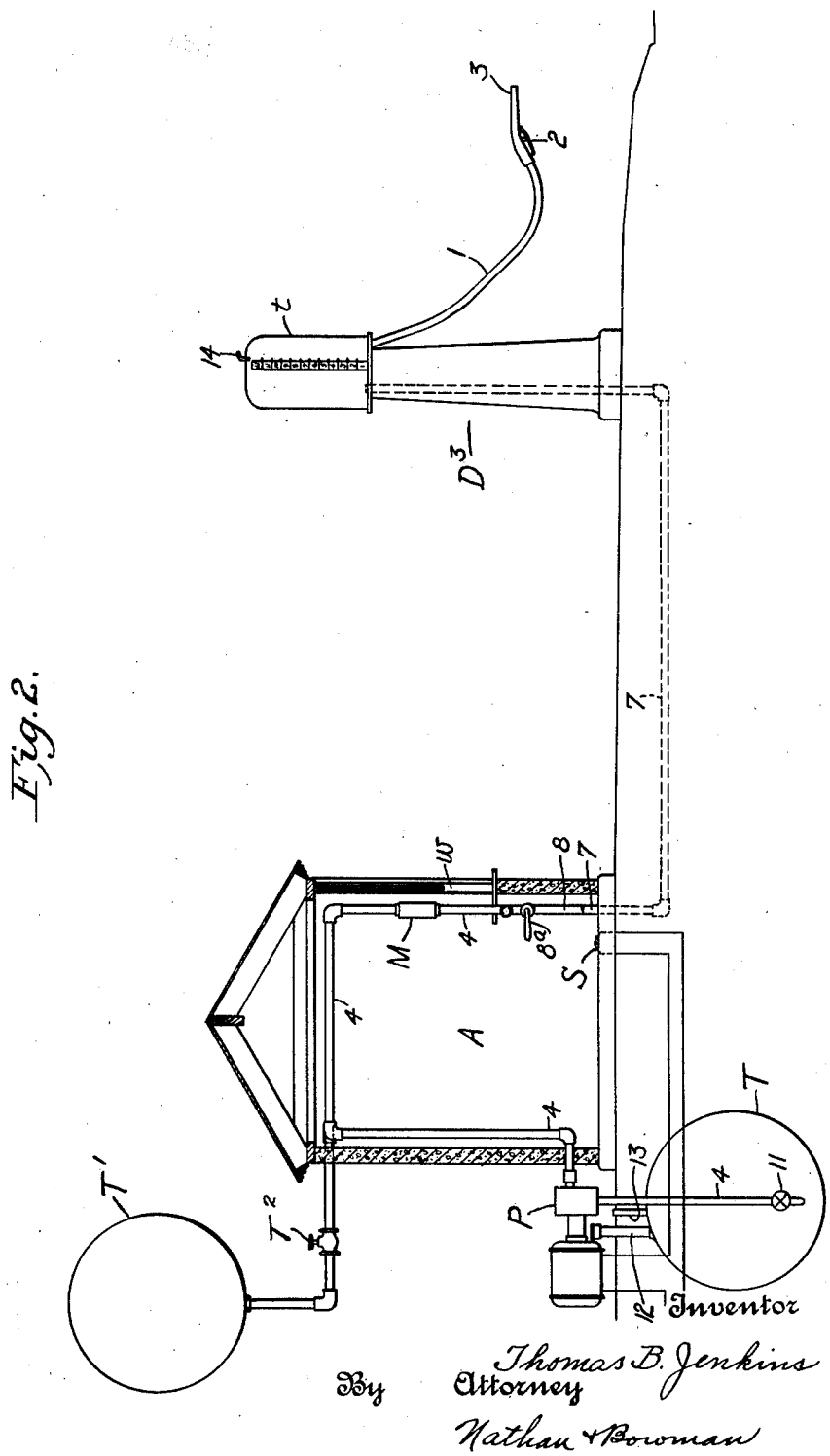

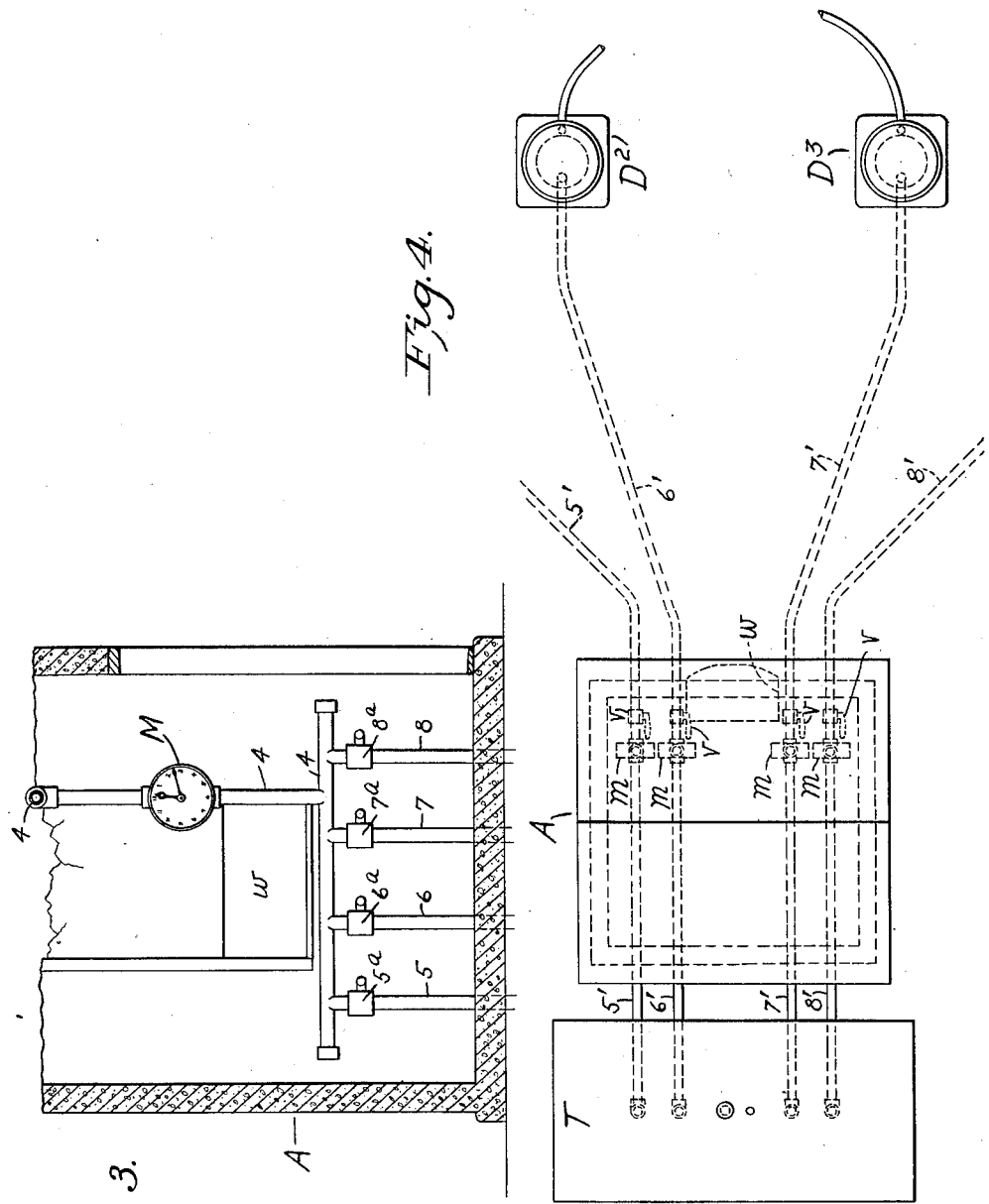

1,869,010

UNITED STATES PATENT OFFICE

THOMAS B. JENKINS, OF RICHMOND, INDIANA, ASSIGNOR TO JENKINS VULCAN SPRING CO., OF RICHMOND, INDIANA, A CORPORATION OF INDIANA

METHOD OF AND MEANS FOR CONTROLLING AND MEASURING LIQUIDS FOR REMOTE DELIVERY

Application filed June 14, 1930. Serial No. 461,238.

This invention relates to an improved method of, and means for, dispensing liquids and is predicated upon the observance that, in systems heretofore employed, the cost of service is excessively and unnecessarily high, thereby materially increasing the price required to be charged for the dispensed product.

The primary object of this invention is to provide a method of, and means for, dispensing liquids whereby a single attendant readily, easily, and without delay, simultaneously may serve a relatively large number of customers. This object has been attained by an ingenious arrangement of a main supply and auxiliary tanks, and means whereby a single attendant, located remote from the auxiliary tanks, may cause measured quantities of liquid from said main supply to be placed in any one of said auxiliary tanks for subsequent removal, as by the purchaser.

The system provided by this invention may be used to advantage for many purposes, such, for example as the dispensing of hydrocarbon fuels. For convenience, this invention will be shown as embodied in an automobile filling station and will be described in connection with the sale and service of gasoline. It is to be understood however that the invention is, in no wise, limited to that specific purpose and that other uses are contemplated and are intended to be included within the scope of the appended claims.

Stated briefly, the improved system provided by this invention consists of and operates as follows:—Arranged so that they may be approached by automobiles, are a plurality of dispensers preferably, but not necessarily, of the type which includes a transparent container or auxiliary tank supported upon a suitable column. At another point, preferably some distance from the auxiliary tanks so that free access may be had thereto, is an attendant's booth or control station. In the preferred form a main supply line, extending from any suitable source of supply, enters the control station and is adapted to be connected, through suitable valve-controlled conduits, with the various dispensers or auxiliary tanks. A meter, or meters, in the attendant's booth discloses to him the amount of gasoline passed to the individual auxiliary tanks and the control valves enable the attendant to determine the amount passed. This invention also contemplates the use of predetermined quantity meters, whereby the amount of liquid passed to any dispenser may be predetermined and will not be dependent upon the subsequent manipulation of a valve by the attendant.

Method of operation

A customer drives his automobile to a position adjacent one of the dispensers. He then approaches the attendant's booth, places his order for the desired amount of gasoline, pays the attendant therefor and returns to his automobile. Upon receiving the order, the attendant opens the valve in the conduit connected with the dispenser adjacent the customer's automobile and with the aid of the meter, delivers to said dispenser the exact amount of gasoline purchased. Preferably the dispenser will include the usual elevated transparent tank with suitable graduations so that the purchaser may be assured that he receives the full measure of gasoline purchased.

The purchaser, upon returning to his car places the delivery nozzle of the dispenser in the filler tube of his gasoline tank, opens the valve in said nozzle, drains the gasoline from said dispenser into his car tank, replaces the cap on his gas tank and departs.

With my improved system it is possible for a single attendant simultaneously to serve a great number of customers. In actual practice two girls working successively eight hours each have sold and delivered to the dispensers in sixteen hours 6500 gallons of gasoline, whereas under prior systems the average sale and service of gasoline in eight hours by a male attendant is not over 500 gallons.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings, depicting a preferred typical construction have been annexed as a part of this disclosure and, in such drawings, like characters of reference denote corresponding parts throughout all the views, of which:—

Figure 1 is a diagrammatic plan view of an automobile filling station embodying my invention and capable of carrying out my improved method of sales and service. Fig. 2 is a vertical sectional view through the control station and showing also an alternative arrangement of the main supply. Fig. 3 is a detail view within the control station showing the individual control valves and the meter. Fig. 4 is a diagrammatic plan view showing a modified arrangement, later to be described.

Referring more specifically to the drawings the invention is illustrated in its preferred form as comprising a main tank T representing a source of supply, an attendant's booth A serving as a combined sales and control station and a plurality of dispensers $D^1$, $D^2$, $D^3$ and $D^4$, preferably located remote from the attendant's booth. For the purpose of this disclosure four dispensers have been illustrated but it is to be understood that a greater or less number may be employed. Each of the dispensers preferably includes an auxiliary transparent tank $t$ supported above the level of the surrounding ground and a flexible pipe or hose 1 connected with the bottom of the auxiliary tank serves to drain gasoline therefrom. Flow of gasoline through said hose may be controlled by a suitable valve 2 preferably embodied in a delivery nozzle 3 thereof.

As shown in Figs. 1 and 2 a main supply conduit, designated generally as 4, is connected with the main tank and extends to the control station A. Auxiliary conduits 5, 6, 7 and 8, connect with the main conduit and extend to the dispensers $D^1$, $D^2$, $D^3$ and $D^4$, respectively, the open ends of said conduits terminating in the auxiliary tanks $t$.

Valves $5^a$, $6^a$, $7^a$ and $8^a$ are embodied within the conduits 5, 6, 7, and 8 respectively, and are operable by an attendant within the control station. By suitable manipulation of said valves an attendant may cause gasoline to flow from said main conduit selectively through any one of said auxiliary conduits for delivery into any one of said auxiliary tanks $t$ or, at will, to discontinue said flow. A meter M, located within the control station and embodied in the main supply conduit, indicates to the attendant the amount of gasoline that has passed from said main conduit for transmission through the auxiliary conduit to the auxiliary tank. If desired, individual meters may be embodied in each of said auxiliary conduits. Also said meters may be of that type which, when once set in operation, will automatically deliver a predetermined quantity of liquid.

Gasoline may be caused to flow from said main tank through said main conduit by any suitable means. In Fig. 1 and in Fig. 2, there is illustrated for that purpose a power driven pump P controlled by a suitable switch S located within the attendant's booth. A relief line 9, controlled by a suitable relief valve 10, serves to limit the pressure in said main conduit. A check valve 11 embodied in the conduit connecting the main tank with the pump serves to prevent reverse flow through said conduit. As also illustrated in Fig. 2, the required pressure may be maintained by having a main tank T' located at an elevation above said control station and said auxiliary tanks. A valve $T^2$ may serve to shut off the flow from the tank T' when gravity feed is not desired. The use of a manual pump within the control station to draw gasoline from the main tank and to force it into said remote auxiliary tanks is also contemplated.

The main tank will preferably be provided with the usual filler opening 12 and vent 13. An air vent 14 may also be provided in each of the auxiliary tanks to permit the escape of air therefrom as the gasoline rises therein. Each auxiliary tank may also be provided with suitable graduations to indicate to the purchaser the amount of gasoline placed therein by the attendant.

The attendant's booth or control station is provided with a suitable window $w$ through which the attendant may observe all of the dispensers and also make sales and collect from the customers.

In Fig. 4 there is illustrated a modified construction. This construction differs from that hereinbefore described in that it eliminates the main pressure conduit, each of the auxiliary conduits 5', 6', 7' and 8', corresponding to the conduits 5, 6, 7 and 8, being connected directly with the main supply tank T.

To measure and control the amount of gasoline passed from the main tank to the dispensers the conduits 5', 6', 7' and 8' are each provided with a meter $m$ and a control valve $v$ located within the control station.

It is to be understood that the term "meter" as used throughout this specification, is not limited to the type of meter illustrated but is intended to include every suitable form of measuring device which the attendant may use to deliver to the customer the quantity of liquid purchased.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A system of distributing predetermined amounts of liquid from a source of supply to a plurality of dispensers, comprising a main supply tank; a plurality of auxiliary delivery tanks, one located at each of said dispensers; a control station; a pressure line extending from said main tank to said control station; a delivery conduit connecting said pressure line with each of said auxiliary tanks; a meter embodied in said pressure line and adapted to indicate to an attendant in said control station the amount of liquid passed therethrough; means in said control station selectively to connect said delivery conduits with said pressure line; and means to discontinue the flow of liquid through said delivery conduits.

2. A system of dispensing predetermined amounts of fuel from a plurality of separated delivery stations, comprising a source of supply; a plurality of elevated tanks one of which is located at each of said delivery stations; a control station remote from said delivery stations; a conduit extending from each of said tanks to said control station; means connecting said conduits with said source of supply; valve means located at said control station to control the flow of fuel from said source of supply through said individual conduits; a meter located at said control station to indicate the amount of fuel passing through the connecting means; and a flexible conduit connected with each of said tanks adapted to withdraw the fuel therefrom.

3. A system of transmitting predetermined amounts of liquid to a plurality of separated delivery stations, comprising a main supply tank; an auxiliary tank at each of said delivery stations; a control station remote from said delivery stations; a main conduit connected with said supply tank and extending to said control station; a pump forcing liquid from said supply tank through said main conduit; valve means to limit the pressure in said main conduit; a plurality of auxiliary conduits connected with said main conduit and each extending to one of said auxiliary tanks; a meter at said control station embodied in said main conduit to indicate the flow of liquid from said main conduit; and individual valve means located in said control station and embodied in each of said auxiliary conduits to control the flow therethrough.

4. A system of transmitting predetermined quantities of gasoline to a plurality of dispensers, comprising an elevated main supply tank; a plurality of auxiliary tanks arranged at a level below said main tank; a control station; a main conduit extending from said main tank to said control station; auxiliary conduits extending from said control station to said auxiliary tanks; means at said control station connecting said auxiliary conduits with said main conduit; metering means at said control station to indicate the amount of gasoline delivered into each of said auxiliary tanks; valve means at said control station to control the flow through said auxiliary conduits; and means to withdraw the gasoline from said auxiliary tanks.

5. A system of transmitting to a plurality of dispensers predetermined quantities of gasoline, comprising a main supply tank; a plurality of elevated auxiliary tanks; a control station remote from said auxiliary tanks; a main conduit connected with said supply tank and extending to said control station; an auxiliary conduit extending from said control station to each of said auxiliary tanks, each of said auxiliary conduits terminating in one of said auxiliary tanks and substantially flush with the bottom thereof; means within the control station connecting the auxiliary conduits with the main conduit; means to maintain liquid under pressure in said main conduit; a check valve to prevent flow of liquid from said main conduit back to said main tank; valves in said control station to control the flow of liquid through the auxiliary conduits; a meter in said station to indicate the amount of liquid passed from the main conduit; a flexible discharge pipe connected with lower portion of each of said auxiliary tanks; and a control valve adjacent the free end of each of said pipes.

6. A gasoline sales station combining a plurality of gasoline dispensers so arranged that they may be approached by automobiles, each of said dispensers including an elevated transparent tank; a combined sales and control booth located remote from said dispensers and so positioned that an attendant therein may see all of said dispensers; a main gasoline conduit extending from a source of supply to said booth; means to keep said conduit filled with gasoline under pressure; means including a meter, conduits and valves controlled by the attendant to deliver selectively into any of said tank predetermined quantities of gasoline in accordance with sales made at said booth; and means to withdrawn the gasoline from said tanks.

7. A system of dispensing predetermined amounts of liquid from a plurality of separated delivery stations, comprising a source of supply; a plurality of elevated tanks, one of which is located at each of said delivery stations; a control station remote from said delivery station; a conduit extending from each of said tanks to said control station and from said control station to said source of supply; valve means located at said control station to control the flow of liquid through said individual conduits; metering means connected with each of said conduits to indicate the amount of liquid passed therethrough; and means to withdraw the liquid from said tanks.

8. A system of dispensing predetermined amounts of liquid from a plurality of separated delivery stations, comprising a source of supply; a plurality of delivery tanks one of which is located at each of said delivery stations; a control station located remote from said delivery stations; a conduit extending from each of said tanks to said control station; means connecting said conduits with said source of supply; valve means located at said control station to control the flow of fluid through said conduits; metering means to indicate the amount of liquid passed through said conduits; and means to withdraw the liquid from said delivery tanks.

In witness whereof, I have hereunto subscribed my name.

THOMAS B. JENKINS.